Nov. 13, 1934.   H. J. MEGLEY   1,980,421
TYPOGRAPHICAL MOLD
Filed April 11, 1931   5 Sheets-Sheet 1
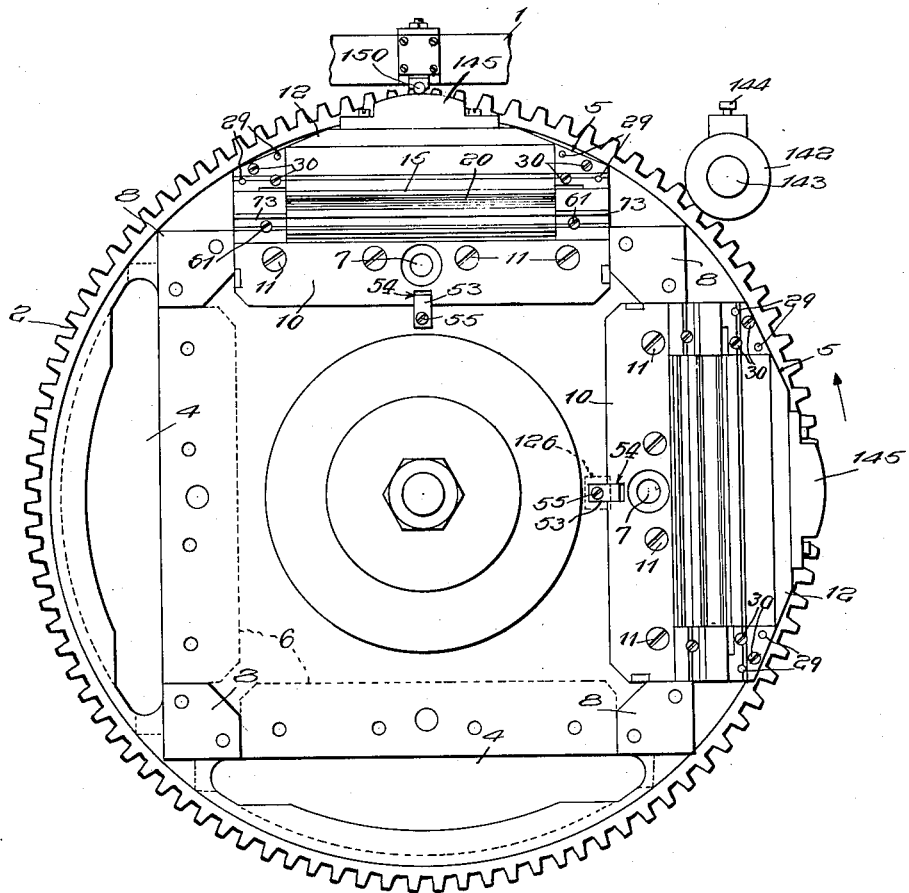
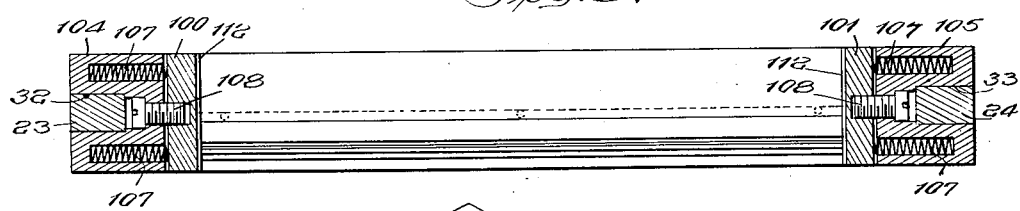
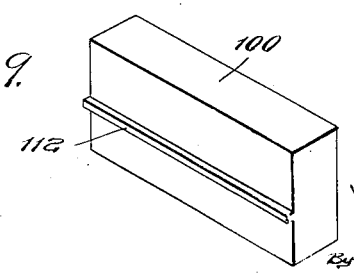
Witness:
William P. Kilroy
Inventor:
Harley J. Megley
Brown, Jackson, Boettcher
& Dienner  Attys Nov. 13, 1934.  H. J. MEGLEY  1,980,421
TYPOGRAPHICAL MOLD
Filed April 11, 1931   5 Sheets-Sheet 2
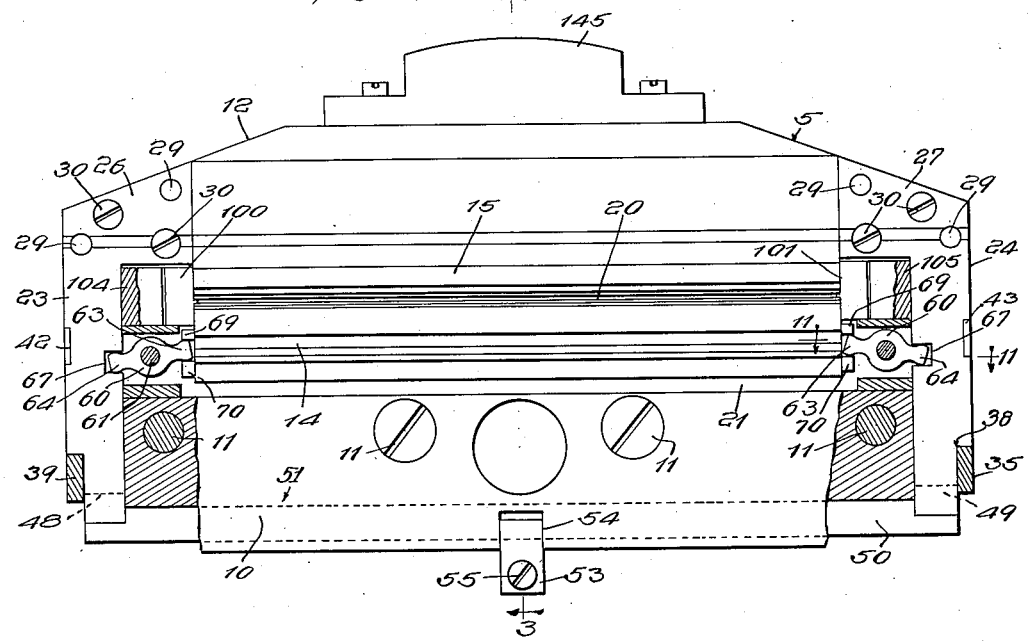
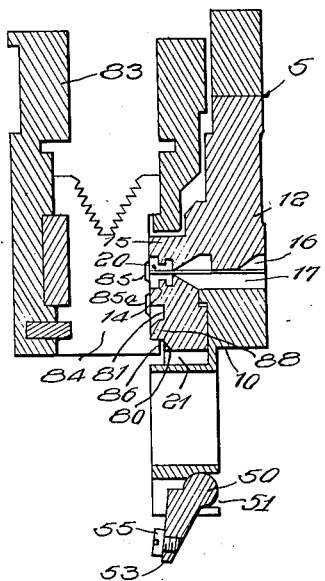
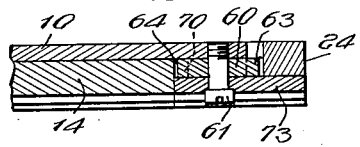
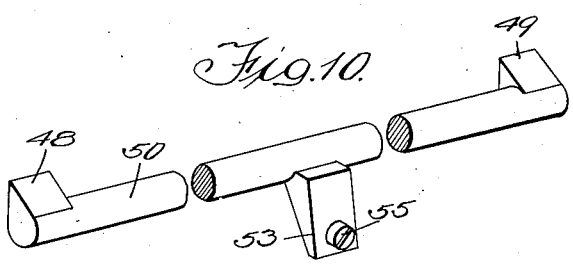
Inventor:
Harley J. Megley Nov. 13, 1934.     H. J. MEGLEY     1,980,421
TYPOGRAPHICAL MOLD
Filed April 11, 1931     5 Sheets-Sheet 3
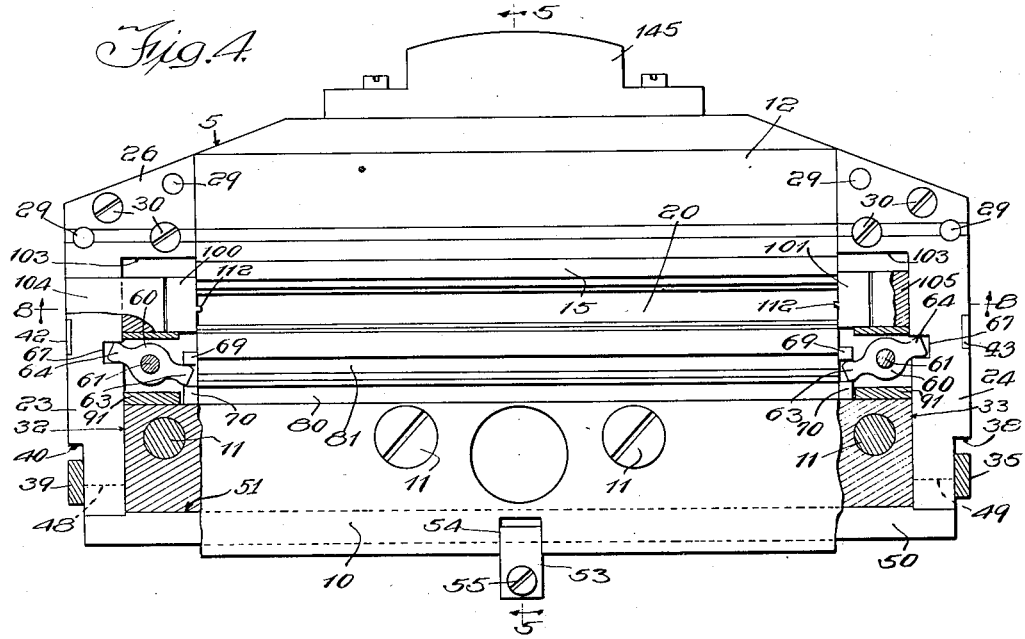
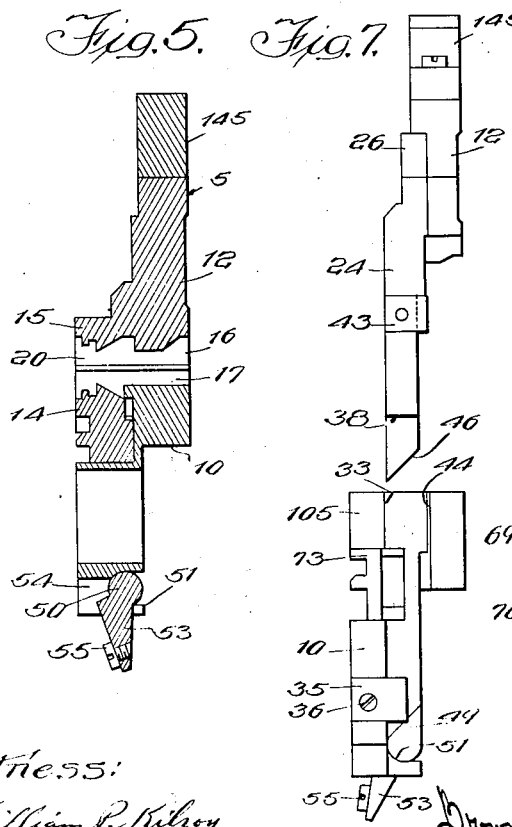
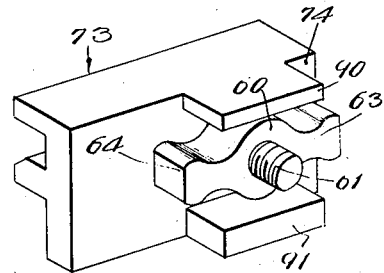
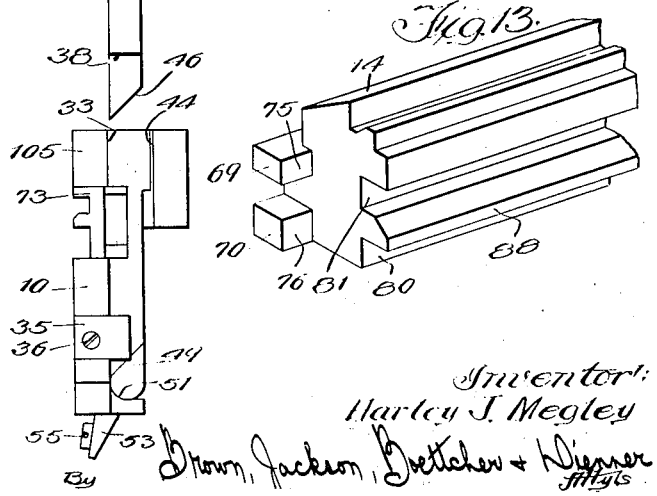
Inventor:
Harley J. Megley
Witness:
William P. Kilroy
By Brown, Jackson, Boettcher & Dienner
Attys Nov. 13, 1934.   H. J. MEGLEY   1,980,421
TYPOGRAPHICAL MOLD
Filed April 11, 1931   5 Sheets-Sheet 4
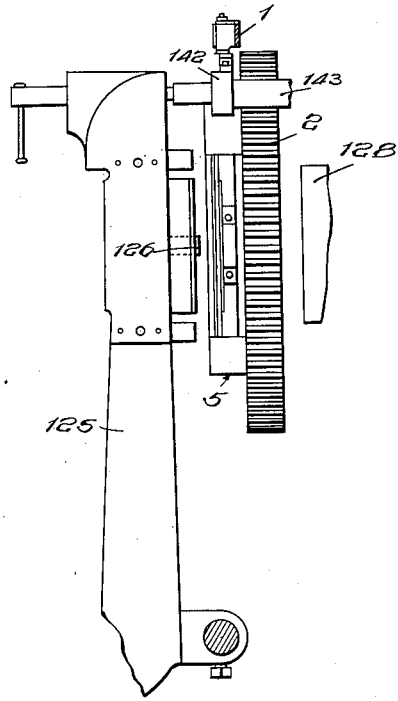
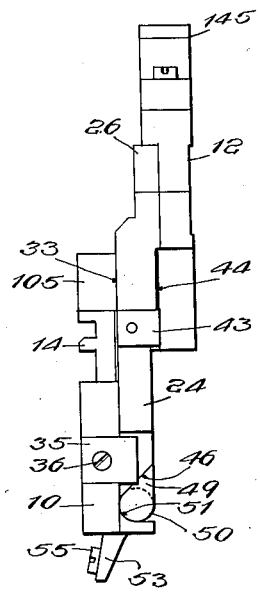
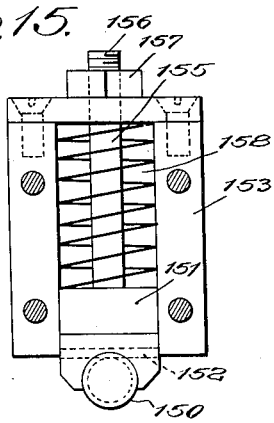
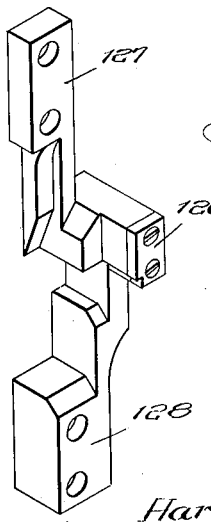
Inventor:
Harley J. Megley Nov. 13, 1934.　　　H. J. MEGLEY　　　1,980,421
TYPOGRAPHICAL MOLD
Filed April 11, 1931　　　5 Sheets-Sheet 5
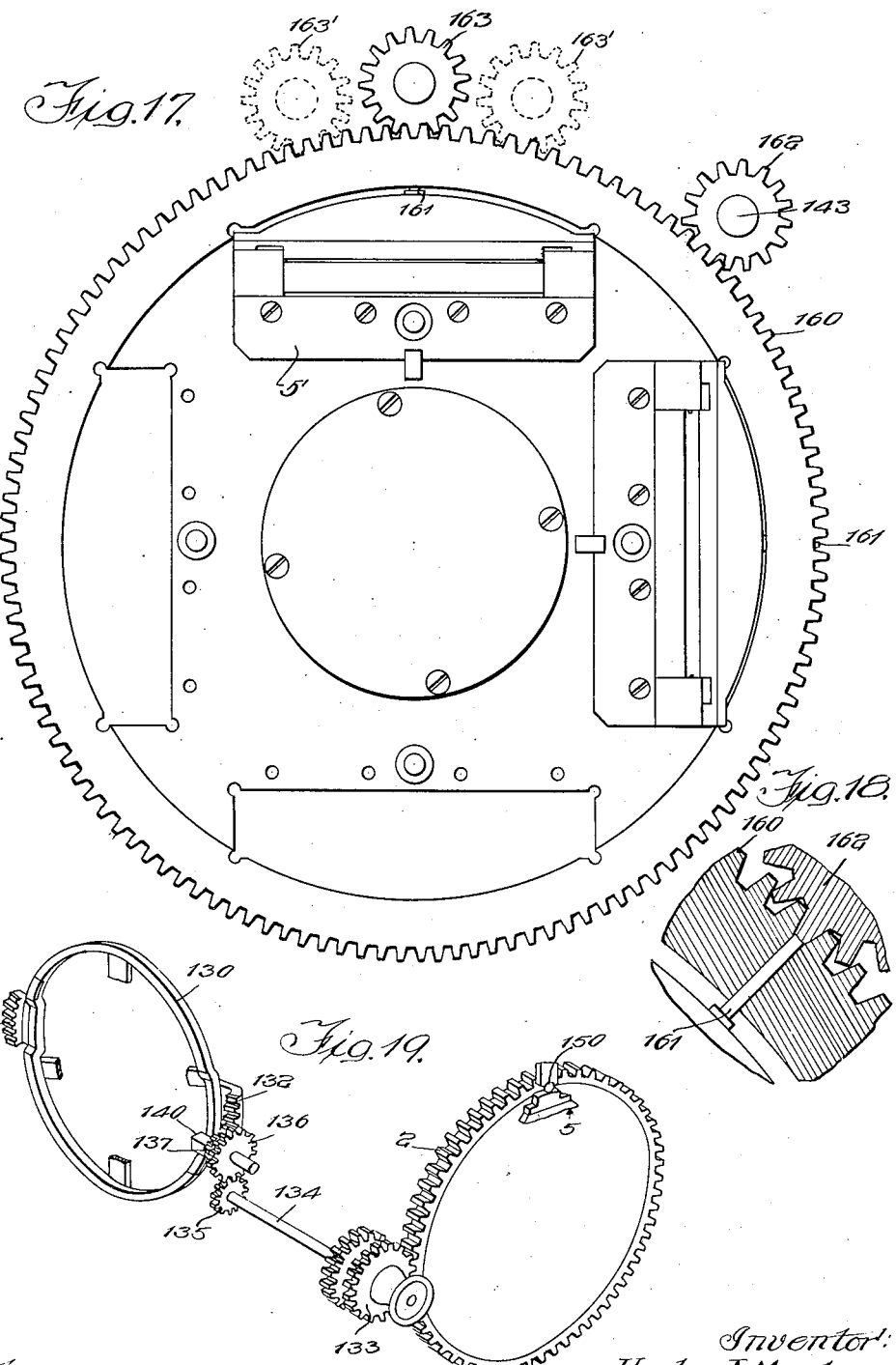

Patented Nov. 13, 1934

1,980,421

UNITED STATES PATENT OFFICE 1,980,421

TYPOGRAPHICAL MOLD

Harley J. Megley, Chicago, Ill.

Application April 11, 1931, Serial No. 529,362

42 Claims. (Cl. 199—55)

The present invention relates to typographical molds for forming type slugs in composing machines of conventional construction, which slugs are constructed and arranged so that by severing the base therefrom type line slugs for use in multigraph machines, rotary printing machines and the like, are produced. Generally, such machines employ type whose height is less than what is known in the art as type high slugs.

In my prior patents, 1,461,927 issued July 17, 1923, 1,601,221 issued September 28, 1926, and 1,752,099 issued March 25, 1930, I have disclosed molds for casting lines of type, each with retention means for cooperation with the chases or other retention means in the type carrier of the multigraph or other printing machines after a supplemental base or gate portion, integrally connected with the printing head or line slug through a weak or relatively fragile connecting portion, has been removed by breaking it off or otherwise severing it from the cast line slug.

The principal object of the present invention is to improve the mold closing operations by providing, in connection with the closing of the mold, means operable as the mold wheel is being driven by its associated gearing from its ejecting position towards its casting position for closing the jaws of the mold while the associated gearing is in full driving engagement and before the gearing begins to disengage, as will be more clearly understood later.

It has been previously proposed to close the jaws of the mold just as the mold wheel is moving into an angular position preceding its forward or axial movement to bring the same into full casting position. Generally this angular position is such that the mold is brought to the top of the wheel, although this may vary, and the jaw closing operation is performed only during the last 2° to 6° of rotation of the mold wheel preceding this position. The introduction of the stress of closing the jaws at this point has a number of disadvantages.

In all the composing machines with which I am familiar the mold wheel is driven by mechanism which includes some sort of multilated gear and cam arrangement, a gear segment operating the mold wheel drive shaft and bevel pinion while continued operation brings the cam portion opposite a flat surface on a member associated with the drive shaft just as the gear segment and bevel pinion are disengaging. The mold wheel is rotated only intermittently while the mutilated gear and cam arrangement is continuously driven. In view of this intermittent operation of the pinion the first and last tooth on the gear segment are reduced in height to make sure that the teeth on the gear segment engage properly with the bevel pinion. Thus there is not full driving engagement between the gear segment and the bevel pinion, neither when the latter begins its rotation, and what is more important, nor as the pinion is completing its rotation for any one period. Thus, just as the mold wheel is completing its last 5° or 6° of rotation before reaching its angular position and ready to be moved forwardly for the casting operation there is some lost motion or play of the mold wheel driving means, even in new machines and which may be further accentuated by wear of these parts, so that if the stresses of closing the jaws are introduced in the cycle of operation of the mold just as the gear segment is moving off the pinion and the cam is moving onto the flat cam block there is danger due to such looseness or lost motion that the mold may not be properly closed or the mold wheel not properly aligned, with the possible consequence that as the wheel is advanced axially to bring the mold into full casting position the matrices will be damaged, the machine jammed, or the cam broken. While the mold closing stresses are not great they may be sufficient by virtue of the above mentioned looseness to throw the machine out of operation. According to the present invention, in closing the jaws of the mold when the mold wheel driving means, including the above mentioned gear segment, is in full driving relation the jaw closing resistance will not act to throw the mold wheel out of alignment and will prevent the cam from being broken.

Another object of the present invention is the provision of a new and improved mold and method of mounting the same for convenient and efficient operation on composing machines of conventional construction which set matrices in line and cast therefrom a solid line or slug as is well known in the art. In this way the utility of previously existing composing or casting machines may be greatly increased and their range of usefulness greatly extended.

Generally, such machines include means for selecting and assembling the various matrices containing the characters to be represented in one line of print. These matrices are then transferred to a position in front of the mold which is mounted, usually by bolts, screws or the like, on a rotatable mold wheel, but the present invention may be used with slidable molds of the type shown in United States Letters Patent to Lucke D'Aix No. 972,591. Where a mold wheel is employed the wheel is rotated and movable axially to bring the mold up against the matrices, and molten type metal is then forced into the mold and against the line of matrices to form the line slug. The wheel is then retracted away from the matrices and rotated to bring the mold in operative relation with respect to an ejecting mechanism. Here the mold wheel is halted and moved forward and the jaws of the mold are separated and the slug ejected. Next, the jaws of the mold are closed as the mold wheel is moved into its casting position again.

The present invention not only provides an improved mold construction per se and an improved mold closing arrangement but also improves the mold opening operations by providing, in connection with the opening of the mold, means on the mold for separating the jaws of the mold and which does not interfere with the operation of the composing machine when using ordinary molds nor does this means require alteration in ordinary molds which may be used on the mold wheel to accommodate this opening means when the ordinary mold is adjacent thereto.

It is also the purpose of the present invention to provide an improved mold construction employed as outlined above and including means to facilitate the ejection of the cast slug and to provide for interchangeable jaws which can be removed or replaced without removing the mold from the mold wheel. The present invention also contemplates the formation of the necessary aligning grooves on the removable jaws, these aligning grooves cooperating with the matrices to position their character bearing portions in proper position relative to the mold as is well known in the art. This is important in the art of forming line slugs for multigraph machines and other similar machines in that it is necessary in order to have the printing characters on the line slugs line up with the conventional individual type letter for multigraphs, etc., that the matrices be positioned with respect to the center line of the mold opening rather than from one edge thereof as is customary in the usual composing machine. For example, in the majority of multigraph machines the bases of the type are generally 12 point regardless of the size of the printing character and the printing characters are centered on the base, whereas in linotype and similar machines a 6 point character on a 12 point base would be near one edge, the additional size of the base being added to one side only. This means that in casting slugs for multigraph machines the aligning grooves must be changed or adjusted with changes in the size of the characters, such as 8- 10- or 12-point, as well known in the art, or with other changes such as a change in the kind of matrices employed.

To make for easier ejection of the cast slug I propose to form guide ribs on the liners at the ends of the mold opening so that there is no danger of the cast slug getting twisted or cocked in the mold and, in addition, such ribs or ridges hold the slug in position in the center of the mold while the jaws are moved away from the slug to open the mold, otherwise the slug would be free to move out of position as the jaws are opening, and may fall from the mold entirely or become jammed in the mold. Thus there is no objectionable tendency for the slugs to resist the movement of the ejector blade which removes the cast slug from the mold. This is an important feature, particularly in casting slugs with weakened neck portions for use in multigraph machines and the like.

While I have briefly outlined above some of the generic features of my invention, other objects and advantages thereof will be apparent to those skilled in the art after a consideration of the following detailed description in which further references will be made to other features of the present invention and which is illustrated in the accompanying drawings, in which:

Figure 1 is a front elevational view of a mold wheel of a type casting or composing machine showing a mold thereon constructed in accordance with the principles of the present invention;

Figure 2 is an enlarged front elevational view of the mold device itself, certain parts being broken away to better show the construction, the jaw portions of the mold being shown in their closed position;

Figure 3 is a cross sectional view taken substantially along the line 3—3 of Figure 2;

Figures 4 and 5 correspond, respectively, to Figures 2 and 3 and show my improved mold when the jaw portions are in opened or spread position;

Figure 6 is an end elevation looking toward the left in Figures 2 and 4;

Figure 7 is a disassembled view of the parts shown in Figure 6;

Figure 8 is a section taken substantially along the line 8—8 of Figure 4 and shows the spring pressed liners carried by the body portion of my improved mold in abutting engagement with the movable jaw portions;

Figure 9 shows one of the spring pressed liners with slug guide ribs thereon;

Figure 10 is a perspective view of the operating cam shaft for opening or separating the jaws of the mold;

Figure 11 is a fragmentary section taken substantially along the line 11—11 of Figure 2 showing one end of the removable jaw portion and associated parts for constraining the two jaw portions to move in opposite directions;

Figure 12 is an enlarged perspective showing one of the end blocks for holding the removable jaw in place and the associated lever which forms a part of the means constraining it to move opposite the other jaw of the mold;

Figure 13 is an enlarged perspective showing one end of the removable jaw portion of the mold;

Figure 14 is a diagrammatic side elevational view of the mold wheel, the associated vise frame and ejector, and the means for operating the opening and closing mechanism of the mold jaws;

Figure 15 is an enlarged view showing the spring pressed abutment means for holding the mold closed during the casting operation;

Figure 16 is a perspective of the mold opening button mounted on the vise frame in a position outside the confines of the usual standard type casting machine mold;

Figure 17 is a front elevational view corresponding to Figure 1 but showing a slightly different type of mold wheel and a different mold closing means;

Figure 18 is a cross section through the mold closing pinion and mold wheel rim as these parts appear as the mold jaws are closed;

Figure 19 is a diagrammatic sketch showing one form of mold wheel driving means with which my improved mold closing means is adapted to operate.

Referring now more particularly to Figures 1 and 2 the reference numeral 1 indicates the face plate carried by the main frame of a conventional composing machine for casting standard type slugs and provided with a mold wheel 2 of any usual or existing construction rotatably and axially movable on the frame of the type casting machine as is usual in such machines. The mold wheel 2 is shown as provided with openings 4 over which molds for casting slugs are mounted. The wheel is adapted to be rotated and moved axially to position the molds successively for the reception of a charge of type metal in what I term the casting position and for ejection of the slug in the usual or any suitable manner in what I term the ejecting position.

For the purpose of the present disclosure I have illustrated two molds 5 identical in construction and embodying certain novel constructional details by which they are arranged when closed for casting a printing slug with retention means for securing the same in a type holder or carrier and with a separable foot or base portion, which will be more fully disclosed hereinafter. These molds are secured to the mold wheel 2 in the usual manner over or in openings similar to those shown in full lines in Figure 1. It is to be understood that in actual operation the latter openings may be provided with molds of existing fixed jaw form so that with the mold wheel 2 provided with two conventional molds and two molds constructed according to the present invention the type casting or composing machine is adapted to selectively produce different types of printing slugs. Since the fixed jaw form of mold is old and well known in the art I have not shown them in detail but have indicated them generally by the reference numeral 6 in Figure 1. Both types of molds 5 and 6 have openings 7 accommodating the usual mold disk aligning or locking studs.

The molds 6 are attached to the front face of the mold wheel 2 by suitable securing means in the form of screws or swiveled bolts (not shown) connected with lugs 8 formed on the mold wheel. It is to be understood that the molds 5 and 6 are interchangeable and may be attached in any desired relation or combination about the face of the mold wheel or carrier and that the casting machine may be operated with molds of one form on the mold wheel at one time and with molds of the other form thereon at another time, as desired, and also that the machine may be operated with both types of molds in combination and at the same time, as indicated above.

The mold 5 comprises a mold body or base member 10 which is provided with openings to receive the screws 11 by which it is attached to the mold wheel in an inward position with respect to the axis of the wheel. It is to be understood, however, that the mold 5 may be, if desired, attached to the mold wheel 2 in the same manner as indicated for the conventional molds 6 above. The improved mold 5 also includes a cap member or outer mold portion 12 which is movably mounted with respect to the body member 10 by virtue of an arm and groove construction to be described more in detail later. These mold sections or members 10 and 12 carry opposed casting jaw portions 14 and 15, the faces of which are suitably grooved and formed to cast a printing slug with the grooves therein forming retention means on the head of the slug for securing it in a type holder or carrier, such as is employed in multigraph machines, and the like, and with a weakened portion connecting the head of the slug to the foot or base portion by virtue of which construction the base portion is severable from the printing head.

The inner or under surface of the top member 12 of the mold 5 is recessed at 16 (Figure 3) to form the space in which the gate or base portion of the printing slug is cast, and the body member 10 of the mold is also recessed at 17 to cooperate with the recess 16 for the same purpose, as best shown in Figure 3. The space formed by the recesses 16 and 17, and the space between the jaw portions 14 and 15, form a casting space for the printing slug and is designated in its entirety by the reference numeral 20.

The jaw portion 15 is preferably integrally formed with the cap or upper mold member, but the lower jaw portion 14 is movably mounted on the base or body member 10 within an offset or recess 21 formed in the body member. The movable jaw portion 14 is slidable in the recess or offset portion 21 toward and away from the casting space 20.

The upper mold member carrying the jaw 15 is slidable with respect to the body member 10 of the mold to carry the jaw 15 also toward and away from the casting space 20. For this purpose the upper mold member 12 carries guide arms 23 and 24 having heads 26 and 27 by which the arms are connected to the cap member 12, as by dowel pins 29 and screws 30. As best shown in Figures 6 and 7, the guide arms 23 and 24 are offset forwardly and are received within grooves or guideways 32 and 33, respectively, formed in the ends of the body member 10.

One end of the body member 10 is notched to receive a clip 35 secured therein by a screw 36 and which cooperates with an offset 38 in the innermost end of the arm 24 to guide the latter in its movement relative to the body member 10. The opposite end of the body member 10 carries a similar clip 39 which cooperates with the recess 40 at the extreme end of the guide 23 for the same purpose. In addition, the guide arms 23 and 24 themselves carry small clips or plates 42 and 43, respectively, the ends of which extend slightly in rear of the surface of the guide arms to cooperate with a small groove 44 formed near the upper edge of the body member 10, as best shown in Figures 6 and 7.

The extreme inward ends of the guide arms 23 and 24 are each formed with a cam surface 46 thereon. When the cap member 12 is assembled in proper position on the body member of the mold the cam ends 46 are contacted respectively by cams 48 and 49 formed at the ends of a cam shaft 50, best shown in Figure 10. This cam shaft 50 is journaled in the body member 10 of the mold for rocking movement therein, and for this purpose the rear surface of the lower edge of the body member 10 is formed with a laterally extending groove 51 having the rear side open for the reception of the cam or rock shaft 50. An operating member or arm 53 is formed on the cam shaft 50 intermediate its ends for the purpose of rocking the shaft 50. This operating member 53 is received within a central slot 54 when the rock shaft 50 is in proper position in the mold. The operating arm 53 carries a contact or abutment element 55 in the form of an adjustable screw and, as best shown in Figure 6, the arm 53 is so arranged that when the two mold sections are in assembled relation the abutment element 55 normally occupies a position adjacent to the plane of the front or forward surface of the mold.

From Figure 6 it will be observed that when the operating member 53 is swung to the right as viewed in that figure the rock shaft 50 will be given a counter-clockwise movement to swing the cams 48 and 49 against the cam surfaces 46 on the ends of the side arms 23 and 24 on the cap member 12. By virtue of the angular relationship of these cam surfaces the arms 23 and 24 will be given an upward movement to separate the upper or outer jaw section of the mold from the body member 10, thus moving the jaw 15, which is integrally formed or secured rigidly to the cap member 12, away from the body member 10 and the opposite jaw 14.

At the same time it is desirable that the movable jaw 14 be given a downward displacement to move that jaw also away from the opposite jaw 15 and the casting space 20. The means to secure this result will now be described. Briefly, a motion reversing mechanism is interposed between the guide arms 23 and 24 on the movable jaw portion 12 and the ends of the movable jaw 14 so that when the outer jaw member 12 is moved upwardly the movable jaw 14 is at the same time moved downwardly, thus when the mold is opened the construction is such that both jaws 14 and 15 are moved away from the casting space 20.

The motion reversing mechanism referred to comprises a pivoted lever 60 journaled on a stud 61 threaded into the body member 10, as best shown in Figures 11 and 12. The lever 60 has arms or ends 63 and 64 of equal length and each is rounded to facilitate engagement with notches or grooves in the arms 23 and 24 and in the ends of the jaw section 14, as best shown in Figures 2 and 4. The rounded end 64 of the pivoted lever 60 engages with a notch or recess 67 in the guide arm 24 while the inner rounded end 63 of the lever 60 is received in a groove between the projections 69 and 70 formed at each end of the movable jaw 14, see Figure 13. The lever 60 at the left-hand side of the mold is associated with the guide arm 23 in an identical manner. Thus when the arms 23 and 24 are urged upwardly by the rocking of the cam shaft 50 the inner ends 63 of the lever 60 are swung downwardly and move the shiftable jaw 14 downwardly against the end wall of the recess or offset portion 21. Figure 2 shows the movable jaw and associated parts in closed position where the jaw 14 is in its upper position, and Figure 4 shows the position the parts take when the jaws 14 and 15 are separated and the jaw 14 is in its lowermost position.

The movable jaw 14 is held in place against the offset surface of the recess 21 by means of a pair of end blocks 73, each having a ledge 74 overhanging the forward faces 75 and 76 of the projections 69 and 70, as shown in Figures 4 and 11. The end blocks 73 are themselves held in position on the body member 10 by the screw studs 61 which, as described above, serve as pivots for the levers 60.

It will thus be seen that by unscrewing the two studs 61 and removing the end blocks 73 the movable jaw 14 is removable from the mold 5 while the latter is in position on the mold disk 2. In this way the mold 5 may be arranged for different kinds of matrices by simply providing a number of interchangeable jaws 14 which can be substituted one for the other without removing the mold 5 from the mold wheel 2. Furthermore, the removal of the jaw 14, the levers 60, and the blocks 73 permits the outer jaw section 12 to be withdrawn from the body portion of the mold, and this, also, may be done while the mold is on the mold wheel. Thus, the mold may be thoroughly cleaned without ever removing it from the mold wheel 2.

The forward face of the movable jaw 14 carries a pair of aligning grooves 80 and 81, preferably formed in the material of the movable jaw itself, but if desired may be formed in a separate piece and secured to the movable jaw 14. These aligning grooves cooperate with lugs or projections formed on the matrices to properly position the matrices to bring their intaglio characters opposite the casting space 20. This will be more clearly understood by referring to Figure 3 where the reference numeral 83 indicates the usual matrix receiving jaw of a type casting machine and 84 represents a matrix in proper position with reference to the casting space 20. As there shown, the projection 86 engages in the lower groove 80 formed by the ridge 88 on the forward face of the movable jaw 14. Generally, the matrices in use today have formed thereon two intaglio characters and I have illustrated such a matrix in Figure 3 where the reference numeral 85a indicates the second intaglio character. As is well understood in the art, the operator may position the matrices in such a position that either of the characters 85 or 85a may be opposite the casting space 20. In order to accommodate this arrangement the second aligning groove 81 is provided, as described above, and which is arranged to receive the projection 86 when the matrix 84 is in a raised position to bring its character 85a opposite the casting space 20.

This is an important feature of the present invention because it is a simple matter to arrange the mold 5 to accommodate different sizes of matrices by merely substituting one movable jaw 14 for the other, this advantage arising because each jaw 14 carries its own aligning grooves 80 and 81. This is particularly advantageous when employing the usual or conventional type casting machine for forming printing slugs for multigraph and similar machines. As is well understood in the art, where printing characters of one size, say 6 point, are to be cast on a base of a larger size, say 12 point, the matrices 84 and associated guide projections 86 are generally arranged to position the one or more intaglio printing characters thereof with respect to the bottom or one edge of the casting space of the slug casting mold, that is, printing characters of a given size on the completed slug as produced in the customary and well known casting machines are always the same distance from the edge of the slug no matter what size the base may be. This is not true in the case of the usual or conventional individual type furnished or employed with multigraph and similar machines. In the latter case, the printing characters of the type are arranged or positioned with respect to the center of the type body rather than the edge and are generally arranged on a 12 point base. Thus if the printing slugs produced in the usual casting machine are to be employed in multigraph machines with the usual multigraph type this difference in positioning of the printing characters must be compensated for.

This compensation is readily secured in the mold of the present invention because since the removable jaws 14 carry their own aligning grooves these grooves can be formed thereon to bring the printing characters on the matrices with which the jaw 14 is to be used in alignment or registration with the center of the casting space, thus placing the printing characters in the center of the cast slug. In this way the printing characters of the slug produced in my improved mold will align exactly with the printing characters on the customary multigraph type in use at the present time.

Although not essential, the end blocks 73 may have grooves formed thereon corresponding to the aligning grooves on the movable jaw 14. In order to prevent the tightening of the threaded stud 61 from binding the pivoted lever 60 the end blocks 73 each carry integral lugs 90 and 91 which embrace the pivoted lever 60 and are seated against the bottom of the recess 21 at the ends of a movable jaw 14.

The ends of the casting space 20 are closed by liners 100 and 101. As best shown in Figures 2, 4 and 8, these liners are spring pressed for abutting engagement with the movable jaw 14 and the integral jaw 15 formed on the upper mold section 12. To accommodate this construction the movable mold section 12 is recessed, as at 103, a distance above the casting space of the jaw 15 to receive the upper ends of the liners 100 and 101 and the upwardly extending block-like projections 104 and 105 of the main body member 10 of the mold. The blocks 104 and 105 are bored to receive the springs 107 which bias the liners 100 and 101 for movement towards the jaws of the mold and inward with respect to the casting space 20. The blocks 104 and 105 are also bored to receive the guide screws 108 which are threaded into the liners 100 and 101 and guide the same as the springs 107 urge them toward the mold jaws. The blocks 104 and 105 are recessed to slidably receive the guide arms 23 and 24 of the movable mold section 12, as referred to above and as indicated by the reference numerals 32 and 33.

As stated above, the liners 100 and 101 serve to close the ends of the casting space 20 and abut against the ends of the jaws, both of which are movable toward and away from each other. These liners carry ribs or projections 112 extending across the opposite ends of the casting space of the mold and serving to cast grooves along the ends of the printing slug and substantially in the central plane thereof. The purpose of the ribs 112 in casting such a groove on the printing slug is to provide positioning means which is effective to hold the slug after it is cast substantially in the center of the casting space 20 so that as each of these jaws 14 and 15 is moved away from one another and away from the central plane of the casting space 20 each jaw will be drawn away from the slug and will be freed thereof without any danger of the printing slug becoming twisted or cocked in the casting space. In other words, the printing slug after it is cast remains in a fixed position in the mold while the jaws are drawn away from both sides of the cast slug. The extension or ribs 112 throughout the height of the slug with its removable base assures that the slug is guided completely clear of the mold in ejection.

The operation of my improved mold device when mounted on a mold wheel 2 of a conventional composing or casting machine will now be considered. Taking only one of the molds 5 and starting with it in the position shown at the top of Figure 1, it will be understood that the jaws of this mold are closed by moving the jaw section 12 toward the body section 10 and inwardly of the mold wheel by means which will be described later so that the parts appear as they are shown in Figures 2 and 3. When the jaws of the mold are closed and the matrices 84 assembled in proper order the mold wheel 2 is moved axially forward to bring the mold in position against the matrices and molten type metal is caused to flow into and fill the casting space 20 from a melting pot (not shown) as is well understood in the art. The next step comprises moving the mold rearwardly and axially to move the mold away from the jaw 83 and the matrices, and then the mold wheel 2 is rotated through substantially 270° and has then reached what I term the ejecting position. In this position the mold wheel 2 is again moved axially forwardly toward the vise frame 125 (Figure 14).

I make use of this movement for opening the mold jaws 14 and 15 by providing an abutment member 126 having lateral extensions 127 and 128 which are adapted to be secured onto the vise frame 125 in a position to bring the abutment 126 in a position to contact with the abutment screw 55 on the operating member 53 of the cam shaft 51. Thus, as shown in Figure 14, when the mold wheel 2 is axially moved towards the vise frame 125 in ejecting position of the mold the abutment 126 contacts with the operating member 53 to rock the cam shaft 51 and move the mold section 12 away from the body member 10, which motion at the same time and through the motion reversing levers 60 causes the movable jaw 14 on the body member 10 to move away from and in a direction opposite to the other jaw 15 which is on the movable mold section 12. At the end of this movement the ejection apparatus of the casting machine, indicated in its entirety by the ejector blade 128 in Figure 14, comes into operation and contacts with the base of the cast printing slug to move the same out of the mold. In this connection, it will be readily seen that the ribs 112 on the liners 100 and 101 effectively hold the cast slug in a fixed position in the mold until the ejection means 128 is actuated and then the ribs 112 and the corresponding grooves on the ends of the slug act to guide the slug in its movement out of the mold.

This is an important feature of the present invention, particularly where printing slugs have a reduced or weakened neck portion formed thereon so that the base may be readily severed. The slug is positively held in a central position in the casting space so that there is no possibility of the head of the slug being twisted from the gate or base portion in the ejecting operation, as might occur if the slug were to become displaced in the mold so that the ejector blade would contact with the base near one edge thereof. Thus where slugs are cast with reduced or weakened portions my improved guide ribs effectively prevent the movement of the ejecting means 128 causing the slug to fracture at this point as it is being moved out of the mold. In addition, it is of course recognized that by holding the slug in fixed position in the mold there is no danger of the slug falling out.

After the jaws of the mold have been opened or spread and the cast slug removed therefrom, the next step is that of closing the jaw portions of the mold so that a second charge of type metal may be inserted into the mold. The means I have provided to this end is of novel construction and operation and is one of the most important features of my invention.

Referring for the moment to Figure 19 it will be observed by those skilled in the art that I have illustrated one of the conventional driving means for actuating the rotatable mold wheel 2. Briefly, such mold driving mechanism includes a cam 130 rotatable about an axis in the main frame of the machine and carrying at predetermined points thereof gear segments 131 and 132 bolted or otherwise secured thereto, as is well known in the art. The gear teeth on the mold wheel 2 are engaged with and driven by a mold disk pinion 133 mounted on a shaft 134 suitably journaled in the frame of the composing or casting machine. The end of the shaft 134 opposite the mold driving pinion 133 carries a mold driving pinion 135 which, in turn, is driven by a gear 136 secured in fixed relation to a mold turning bevel 137. The assembly including the pinion 137 and the gear 136 is journaled for rotation in position adjacent the rotatable cam 130, and this assembly also includes a cam block 140 of square or rectangular formation and positioned closely adjacent one side of the cam 130. The gear segments 131 and 132 secured on the cam 130 are arranged to engage with the teeth on the bevel pinion 137 to drive the gear 136 and the associated shaft 134 and mold wheel 2 at timed intervals, as is well understood in the art. The cam 130 and the cam block 140 are so arranged in co-operative relationship that after the mold turning interval has elapsed and the gear segment 131 or 132 has passed from engagement with the bevel pinion 137 the cam 130 comes into substantial engagement with one of the flat sides of the cam block 140 for the purpose of preventing further rotation of the mold driving mechanism until the other gear segment 132 or 131 comes into engagement with the bevel pinion 137 to advance the mold wheel 2 through another portion of its cycle of operation.

In order to facilitate the segments 131 and 132 passing into and out of engagement with the teeth on the bevel pinion 137 it is customary that the first and last tooth on each segment shall be made lower than the others. The result is that just as the mold is coming into either of the positions shown in full lines in Figure 1 the last or reduced tooth on the segment 132 is leaving the pinion 137. Thus, there is not full driving engagement between the teeth so that if the mold wheel is retarded by an additional resistance just at this time the pinion 137 will be stopped before the flat side of the cam block 140 is in a position to engage the rotating cam 130. In addition, the mold wheel will be halted with its aligning or locking studs 7 out of proper position and the studs may be damaged and the machine stopped. In either case it will be seen that there is considerable danger in introducing the jaw closing resistance into the machine just at the time when the driving engagement of the gear segment 132 and the bevel pinion 137 are moving out of engagement and the cam 130 and the cam block 140 are moving into engagement may cause the mold wheel and the mold disc locking studs to take a position out of alignment with their co-operating parts on the vise frame 126. If the operation of the machine is continued with these parts out of alignment, it is obvious that the matrices may be destroyed or greatly damaged, the machine jammed, and the cam broken. According to the present invention, therefore, I propose to move the jaws of the mold to their closed position only during the time that the teeth of the gear segments are in full driving engagement with and driving the pinion 137. In this way the small amount of stress which is due to the closing resistance of the jaws of the mold is introduced into the machine at a time when the gears are in driving relation with the teeth of the gear segment in full driving engagement with the teeth of the gear 136 so that no displacement can possibly arise due to the small additional force necessary to cause the jaws to close.

More specifically, I propose to close the jaws of the mold 5 after the cast slugs have been ejected therefrom and when the mold wheel 2 is being rotated with the driving gears in full driving engagement to bring the mold from its ejecting position, the position the mold occupies at the right-hand side of Figure 1, to its casting position, that shown at the top of Figure 1. Thus, the mold jaws are moved to their closed position when the gears 132 to 137 inclusive are all in full driving engagement and the teeth thereof held tightly against one another at an appreciable length of time before the mold disk comes forward to lock the matrices preceding the casting operation. The specific means I provide for this purpose includes a collar 142 positioned on one of the vise locking studs 143 on the casting machine itself. The collar 142 is held on the stud 143 by a set screw 144. In machines with which I am familiar this vise locking stud 143 is in its upper position which, when equipped with a collar 142 which may or may not be rotatable thereon, is effective to close the jaws of the mold as it leaves its ejecting position and is driven toward its casting position. It may occur, however, that other casting machines may not be equipped with such a stud in the proper location, and in such cases I contemplate mounting the collar 142 on a separate stud or support suitably secured in any manner desired to the framework of the machine, on the vise frame, or on any other suitable or preferred support. Any such support is satisfactory, the only essential being that the collar or other gear closing means equivalent thereto should be positioned to operate the mold to close the jaws as the mold is moved from its ejecting position to its casting position and in the manner already described. In the particular mold illustrated the collar 142 on the stud 143 contacts with a suitable cap piece 145 fixedly secured to the movable jaw section 12.

Remembering that as the mold reaches the ejecting position the operating member 53 is actuated to rock the cam shaft 51 and move the arms 23 and 24 of the movable mold section outwardly, it will now be noted that as the mold wheel 2 is driven the mold passing out of its ejecting position will approach the mold closing collar 142 which will contact with the rounded outer surface of the cap piece 145 to move the outer movable jaw section 12 inwardly with respect to the body portion 10. As explained above, this relative movement between the mold section 12 and the body section 10 will swing the levers 60 and move the movable jaw 14 towards the jaw 15 carried by the movable jaw section 12. Thus the jaws 14 and 15 approach one another in the mold closing operation.

When the mold reaches its casting position it is necessary to prevent the mold jaws from separating under the force of the injected molten type metal. The means I have provided to this end is shown in Figures 1 and 15 and comprises a spring pressed abutment member 150 in the form of a hardened steel roll seated in a cylindrical recess in a plunger 151. The plunger is provided with a transverse bore to receive a pin 152 which, as shown in Figure 15, is arranged to occupy a small notch milled in the surface of the roll 150. This construction effectively maintains the abutment member 150 in position in the plunger 151. The plunger is movable within a shell or housing 153 which is adapted to be secured to some part of the frame of the casting machine, such as the mold disk shield or face plate 1. The plunger carries a stem 155 having an upper threaded end 156 projecting through the upper end of the shell 153, and a nut 157 is threaded onto the stem 155 and serves as an adjustment for maintaining the abutment member 150 in proper position. The spring 158 acts to press the abutment member downwardly while the nut 157 may be actuated to move the abutment upwardly and maintain it in adjusted position.

Referring now to Figure 1, it will be seen that as the mold wheel 2 is driven to bring the mold 5 from the jaw closing collar 142 to the casting position the cap piece 145 will come into contact with the abutment 150 whereby the movable jaw section 12 will be prevented from moving outwardly of the mold, and hence the jaws 14 and 15 will be held in their closed or casting position. Since the jaws of the mold were closed by the collar 142 while the mold driving mechanism was rotating the mold wheel 2 from an ejecting position to the casting position the only function performed by the abutment member 150 is to hold the mold closed. As the mold 5 approaches casting position no additional resistance is encountered and the presence of the abutment member creates no tendency to disturb the proper positioning of the mold during the lock up operation in the casting position.

In the above disclosure of my invention I have described and illustrated in Figure 1 the mold 5 as being attached to a mold wheel 2 of a known type where the mold is secured to the mold wheel in a plane forward of the toothed rim of the mold wheel. This form of mold wheel is well known in the art and is quite extensively employed in the industry. There is, however, another quite well known form of mold wheel in use at the present time in which the molds are secured to the wheel within the rim of the same and in a plane which includes the toothed rim. In this type of mold wheel, which I have illustrated in Figures 17 and 18, I provide a slightly different form of mold closing means but one which for all practical purposes operates substantially the same as the structure described above.

In Figures 17 and 18 the mold 5' is shown as mounted within the confines of the rim 160 of the wheel. The rim 160 is provided with a radial bore adjacent the cap piece 145 on the movable jaw section 12 of the mold and this bore receives a pin 161 which is so dimensioned, as best shown in Figure 18, that in the closed position of the mold the upper or outer end of the pin 161 occupies a position substantially at the bottom of the space between the teeth formed on the rim 160 and the mold wheel. When the jaws of the mold are opened, as by the means 126 described above, the jaw closing pin 161 occupies a position shown in Figure 17 at the right thereof.

The vise locking stud 143 or other support as explained in connection with the previous embodiment carries, instead of the jaw opening collar 142 shown in Figure 1, an idler pinion 162 journaled thereon. In some machines where the vise locking stud is not in a position such as is illustrated in Figures 1 and 17, I contemplate the provision of a bearing stud upon which to mount the idler pinion 162 in a position between the ejecting position of the mold and its casting position. Thus, in the structure illustrated in Figure 17, as the mold with its jaws 14 and 15 separated after the ejecting operation is rotated past the idler pinion 162 the teeth on the pinion contact with the upper or outer end of the pin 161 and force the same inwardly, thereby closing the jaws while the mold wheel is being driven by the mold driving mechanism illustrated in Figure 19.

When the mold reaches its casting position the pin 161 has already been moved inwardly to close the jaws by the idler pinion 162 and a second idler pinion 163 carried by the main frame of the machine or by the face plate shield comes into engagement with the upper end of the pin 161 and effectively holds the jaws 14 and 15 of the mold in their closed position and against the force of the injected molten type metal. Like the abutment member 150 shown in Figure 1, the idler 163 is not called upon to transmit any force and hence if there should be any looseness or play in the mold driving parts shown in Figure 19 there is no tendency for the idler pinion 160, or for the abutment 150 as well, to throw the mold out of alignment with its cooperating injecting and vise mechanism before the casting operation. In other words, all jaw closing resistance is introduced into the casting machine mechanism while the mold driving mechanism is pulling under tension and when the gears are all in full driving engagement.

If desired, more than one jaw holding pinion 163 may be provided. For example, in Figure 17, I have shown two additional pinions 163' journaled on the casting machine frame. In this case there would also be two additional pins 161, one for each jaw holding idler. This form is advantageous in that the jaws of the mold are firmly held in closed position at a plurality of points.

While I have shown and described in connection with the accompanying drawings the preferred embodiment of the present invention it is to be understood that my invention is not to be limited to the particular means shown and described but that, in fact, widely different means may be employed in the practice of the broader aspects of my invention.

What I claim, therefore, and desire to secure by Letters Patent is:

1. In combination, a type casting mold adapted for casting a type slug and comprising jaw means movable into open and closed positions, said mold having type casting and type ejecting positions, driving means for moving said mold from each of said positions to the other, and means for positively closing said jaw means while said driving means is in full driving engagement.

2. In combination, a mold carrier, a type casting mold for use thereon and adapted for casting a type slug, said mold comprising jaw means movable into open and closed positions, gear means for driving the mold carrier, and means actuated by the force of said driving means for closing the jaw means of the mold while said gear means is in full driving engagement.

3. In combination, a mold carrier, a type casting mold for use thereon and comprising jaw means movable into open and closed positions, gear means for driving the mold carrier, said mold having a position in which the toothed engagement of said gear means is released and means positioned adjacent the path of movement of the mold and sufficiently ahead of the position in which said gear means is released for closing said jaw means while said gear means is in full driving engagement.

4. In combination, a type casting machine including a revolvable mold wheel and means for intermittently driving said wheel to and from casting position, a mold adapted for use on said mold wheel for casting a type slug and comprising jaw means movable into open and closed positions, and means actuated by the force of said intermittent driving means for closing said jaws while the intermittent driving means is in full driving engagement.

5. In combination, a mold wheel revolvable and movable axially, a type casting mold for use thereon and comprising jaw means movable into open and closed positions, means for turning the mold wheel to move the mold to and from casting position, and means disposed exteriorly with respect to said mold wheel and spaced circumferentially ahead of a plane extending through the axis of the mold wheel and through the angular position of the mold which corresponds to casting position in the path of turning movement of the mold wheel for closing the jaw means of the mold ahead of said position.

6. In combination, a type slug casting machine including a revolvable mold wheel and a cooperating vise frame, a mold adapted for use on said mold wheel for casting a type slug and comprising jaw means movable radially of said wheel into open and closed positions, means spaced circumferentially of said wheel ahead of the position corresponding to casting position of the mold for closing the jaws of said mold while the mold wheel is being driven toward said casting position, and means on said vise frame for opening said jaw means after the mold wheel has been driven beyond its casting position.

7. In combination, a type casting machine, a mold adapted for use thereon for casting a type slug and comprising a pair of separately movable jaw means shiftable into open and closed positions, driving means for shifting said mold to and from casting position, and means actuated by the force of said driving means for closing said jaw means while said driving means is in full driving engagement.

8. In combinaton, a revolvable mold wheel, a mold adapted for use thereon for casting a type slug and comprising a pair of separately movable jaw means movable into open and closed positions, driving means for shifting said mold to and from casting position, means for moving each of said jaws away from the cast slug, and means spaced circumferentially from casting position of the mold for closing said jaws.

9. In combination, a composing machine having a mold wheel, a mold device attached thereto and including a stationary body portion having a relatively movable jaw portion thereon and a second jaw portion movable with respect to said body portion and said first named jaw portion, inwardly extending means on the stationary body portion for separating said jaw portions to permit ejection of a cast slug, and subsequently operable means to completely close said jaw portions while the machine is in operation but before the mold reaches its casting position.

10. In combination, a composing machine having a mold wheel and means for intermittently driving the same, a mold device adapted to be attached to said wheel and to cast a type slug, said mold device including a stationary body portion including a jaw portion constituting a mold for a portion of the opposite faces of the slug, a movable jaw portion constituting a mold for another portion of said slug faces, radially extending means on the stationary body portion for separating said jaw portions to permit ejection of a cast slug, and means actuated when said intermittent means is driving the mold wheel for completely closing said jaw portions before said mold reaches its casting position.

11. In combination, a mold wheel, a mold adapted for use thereon and having separately movable jaws, a main frame, a vise frame, means on one of said frames for moving the jaws to open position, and means on the other frame for moving the jaws to closed position.

12. In combination, a mold wheel, a type slug casting mold for use thereon and comprising jaw means movable into open and closed positions, a standard mold adapted for use on said mold wheel and means disposed outside the normal confines of said standard mold in all positions thereof for moving the jaw means of said first mold to open position.

13. In combination, a rotatable and axially movable mold wheel, a mold adapted for use thereon for casting a type slug and having separately movable jaws, a main frame, means on the main frame for intermittently driving the mold wheel to slug casting position and to slug ejecting position, a vise frame, means on the vise frame for moving the jaws to open position while the mold wheel is in slug ejecting position, and means for moving the jaws to complete closed position while the mold wheel is being rotated and after slug ejecting position but before the mold is turned with the mold wheel fully into position adjacent slug casting position.

14. In combination, a rotatable and axially movable mold wheel, a mold adapted for use thereon for casting a type slug and having separately movable jaws, a main frame, means for intermittently driving the mold wheel to slug casting position and to slug ejecting position, a vise frame, means on the vise frame for moving the jaws to open position while the mold wheel is in slug ejecting position, means for moving the jaws to closed position while the mold wheel is being rotated from slug ejecting to slug casting position, and independent means for holding the mold jaws in closed position.

15. In a composing machine, in combination, a rotatable mold wheel, a mold adapted for use thereon in casting a type slug and having separately movable jaws, a main frame, means for moving the jaws to closed position, and means on the main frame for holding the mold jaws in closed position during casting operation, said means comprising a relatively stationary abutment.

16. A mold of the class described comprising, in combination, a body portion and a jaw portion movable thereon, a second jaw portion, said jaw portions arranged when closed for casting a slug with retention means on the head thereof for securing the same in a type holder or carrier, and lever means constraining said jaw portions to move toward or away from each other.

17. A mold of the class described comprising, in combination, a body portion and a jaw portion movable thereon, a second jaw portion, said jaw portions defining a casting space and arranged when closed for casting a slug with retention means on the head thereof for securing the same in a type holder or carrier, liner pieces at the ends of the casting space and each provided with a rib extending inwardly of the casting space for casting guiding grooves on the line slug to facilitate its ejection and to hold the slug in position therein when the mold is open, and means for moving both of said jaw portions away from the plane of said guiding grooves whereby the cast slug is freed from both jaw portions.

18. A mold of the class described comprising a body member having a jaw portion, a movable jaw portion cooperating with said first jaw portion for casting a type slug, said second jaw portion carrying a pair of projecting arms slidable on the body member, and means on the body member for moving said arms to spread said jaw portions.

19. A mold of the class described comprising a body member having a jaw portion, a movable jaw portion cooperating with said first jaw portion for casting a type slug, said second jaw portion carrying a pair of projecting arms slidable on the body member, the body member having grooves receiving said arms and the ends of the arms having cam surfaces, and cam means on the body member for moving said arms outwardly of the body portion to separate said jaw portions.

20. A mold of the class described comprising a body member having an offset surface, a jaw portion slidably mounted thereon, a movable jaw portion cooperating with said first jaw portion and having a pair of guide arms, guideways for said arms adjacent said offset surface, means cooperating with said arms for moving them to shift the second jaw portion away from the first jaw portion, and means operable by movement of the arms in guideways for moving said first jaw portion in an opposite direction.

21. A mold of the class described comprising a body member having an offset surface, a jaw portion slidably mounted thereon, a movable jaw portion cooperating with said first jaw portion and having a pair of guide arms, guideways for said arms adjacent said offset surface, a cam member on the body member cooperating with said arms for moving them to shift the second jaw portion away from the first jaw portion, and means interconnecting said two jaw portions for moving one by the other and in an opposite direction.

22. A mold of the class described comprising a body member having an offset surface, a jaw portion slidably mounted thereon, a movable jaw portion cooperating with said first jaw portion and having a pair of guide arms, guideways for said arms adjacent said offset surface, means cooperating with said arms for moving them to shift the second jaw portion away from the first jaw portion, and removable end blocks mounted on the body member at the ends of said slidably mounted jaw portion, a portion of said blocks overlying a portion of said slidable jaw portion for holding the latter in place, whereby said jaw portion is removable by removing said end blocks.

23. A mold of the class described comprising a body member having an offset surface, a jaw portion slidably mounted thereon, a movable jaw portion cooperating with said first jaw portion and having a pair of guide arms, guideways for said arms adjacent said offset surface, means cooperating with said arms for moving them to shift the second jaw portion away from the first jaw portion, recessed end blocks having portions spaced from and overlying said offset surface, said slidably mounted jaw portion having bifurcated ends received therebetween and said guide arms having recesses substantially opposite said ends, means securing said end blocks in place, and pivoted lever means having ends received in said recesses and the bifurcations of said jaw portion whereby movement of the arms in said guideways is operable to move said jaw portions in opposite directions.

24. In combination, a mold wheel, a vise frame, a mold device adapted to be attached to the mold wheel and including a movable jaw portion, a rock shaft having cam means on the mold for shifting said movable jaw portion, and means on the vise frame for actuating said rock shaft.

25. In combination, a mold wheel and a mold device adapted to be attached thereto, said mold device including a pair of relatively movable jaw portions, at least one of which is removable from the mold while the latter is attached to the mold wheel.

26. A composing machine comprising, in combination, a mold wheel, means for holding a line of matrices adjacent the mold wheel, each of said matrices bearing a plurality of characters, a mold device including a jaw removably mounted on the mold for casting a slug with retention means on the head thereof for securing the same in a type holder or carrier, said removable jaw provided with aligning means acting as a matrix keeper for positioning said matrices for casting with the characters thereof disposed substantially centrally of the casting space, regardless as to the size of the matrix being utilized and of the width of the casting space, the latter being dependent upon the particular removable mold jaw utilized.

27. In combination, a type line casting machine including a mold wheel having openings in which molds of usual formation may be removably secured, a plurality of matrices, each having at least one intaglio character and a guide lug thereon normally adapted to position the matrices with reference to one edge of the casting space of the mold, a mold device adapted to be removably secured to said mold wheel and having relatively movable jaws adapted to form therebetween a casting space for casting a slug with retention means on the head thereof for securing the same in a type holder or carrier, one of said jaws being removable, and a plurality of other removable jaws which together with said one removable jaw adapt said mold device for use with different matrices, each of said removable jaws being dimensioned to form with the cooperating jaw a casting space of the desired width and carrying matrix keeper means to cooperate with the guide lugs of the matrices with which said jaw is arranged to operate for positioning the intaglio characters thereof with respect to the center of the casting space formed by the two cooperating jaws of the mold.

28. In combination, a standard type line casting machine including a mold wheel having openings in which molds of usual formation may be removably secured, a plurality of matrices having guide lugs thereon adapted to position the matrices with reference to one edge of the casting space of the mold, a mold device adapted to be removably secured to said mold wheel and having relatively movable jaws for casting a multigraph slug with retention means on the head thereof for securing the same in a type holder or carrier, one of said jaws being removable, and a plurality of other removable jaws which together with said one removable jaw adapt said mold device for use with matrices of different sizes, each of said removable jaws carrying matrix keeper means to cooperate with the guide lugs of the matrices with which said jaw is arranged to operate for positioning the intaglio characters of the matrices with respect to the center of the casting space of the mold.

29. In combination, a rotatable mold wheel and a mold device adapted to be attached thereto, said mold device including a pair of relatively movable jaw portions, one of which is removable from the mold in a generally radial direction with respect to said mold wheel while the latter is removable from the mold wheel in a generally axial direction.

30. In combination, a composing machine having a mold wheel, a mold device attached thereto and including a stationary body portion having a relatively movable jaw portion thereon and a second jaw portion movable with respect to said body portion and said first named jaw portion, cam means for separating said jaw portions to permit ejection of a cast slug, and subsequently operable means to completely close said jaw portions while the machine is in operation but before the mold reaches its casting position.

31. In combination, a composing machine having a mold wheel, a mold device attached thereto and including a stationary body portion having a relatively movable jaw portion thereon and a second jaw portion movable with respect to said body portion and said first named jaw portion, cam means movably carried by the stationary body portion for separating said jaw portions to permit ejection of a cast slug, and subsequently operable means to completely close said jaw portions while the machine is in operation but before the mold reaches its casting position.

32. In combination, a composing machine having a mold wheel and a cooperating vise frame, a mold device attached thereto and including a stationary body portion having a relatively movable jaw portion thereon and a second jaw portion movable with respect to said body portion and said first named jaw portion, abutment means disposed on the vise frame, cam means on the mold wheel and adapted to be actuated by said abutment means on the vise frame for separating said jaw portions to permit ejection of a cast slug, and subsequently operable means to completely close said jaw portions while the machine is in operation but before the mold reaches its casting position.

33. In combination, a composing machine having a mold wheel and a cooperating vise frame, a mold device attached thereto and including a stationary body portion having a relatively movable jaw portion thereon and a second jaw portion movable with respect to said body portion and said first named jaw portion, abutment means disposed on the vise frame, means movably carried by the mold wheel and adapted to be actuated by said abutment means on the vise frame for separating said jaw portions to permit ejection of a cast slug, and subsequently operable means to completely close said jaw portions while the machine is in operation but before the mold reaches its casting position.

34. In combination, a mold wheel, a mold adapted for use thereon and having relatively movable jaws, a main frame, a vise frame, means for moving said jaws to open position, said means including cam elements for shifting one jaw relative to the other and at least one part carried by one of said frames, and means on the other frame for moving the jaws to closed position.

35. In combination, a mold wheel, a mold adapted for use thereon and having relatively movable jaws, a main frame, a vise frame, means for moving said jaws to open position, said means including cam elements disposed on the mold wheel for shifting one jaw relative to the other and an actuator carried by one of the frames, and means on the other frame for moving the jaws to closed position.

36. In combination, a rotatable and axially movable mold wheel, a mold adapted for use thereon and having relatively movable jaws, means operated by axial movement of the mold wheel to open the jaws, and means operable by rotational movement of the mold wheel for closing the jaws.

37. In combination, a mold wheel, means for driving the wheel, a type slug casting mold for use thereon and comprising jaw means movable into open and closed positions, a standard mold adapted for use on said mold wheel and means actuated by the force of said driving means disposed outside the normal confines of said standard mold in all positions thereof for moving the jaw means of said first mold to open position.

38. A mold of the class described comprising, in combination, a body portion and a jaw portion movable thereon, a second movable jaw portion, said jaw portions arranged when closed for casting a slug with retention means on the head thereof for securing the same in a type holder or carrier, and means carried by said body portion for constraining said jaw portions to move toward or away from each other.

39. A mold of the class described comprising, in combination, a body portion and a jaw portion movable thereon, a second movable jaw portion cooperating with said first jaw portion, means acting through one of said jaw portions for holding said one jaw portion in closed position, and means carried by said body portion and actuated by said first named means for holding said second jaw portion in closed position.

40. A mold of the class described comprising a body portion and a removable mold section carried thereby, means for securing said body portion to a mold wheel, and a second mold section movably carried on said body portion and cooperating with said first mold section to form a casting space therebetween, said removable mold section being adapted to be detached from said body portion while the latter is attached to the mold wheel.

41. A mold of the class described comprising a body portion having a mold section receiving recess, a mold section mounted in said recess, means removably securing said mold section therein, means for securing said body portion to a mold wheel, and a second mold section movably carried on said body portion and cooperating with said first mold section to form a casting space therebetween, said removable mold section being adapted to be detached from said body portion while the latter is attached to the mold wheel.

42. A mold device adapted to be used with matrices having intaglio characters thereon and guide lugs to properly position the matrices, said mold device comprising a pair of cooperating mold sections, one removable with respect to the other, the removable section determining the width of the casting space between the mold sections when the mold is closed for casting, and aligning means on said removable mold section correlated with the width of the casting space provided by said removable section cooperating with the other mold section to bring the intaglio characters of the matrices to the proper position relative to said casting space.

HARLEY J. MEGLEY.